United States Patent
Månsson et al.

(10) Patent No.: US 9,218,105 B2
(45) Date of Patent: Dec. 22, 2015

(54) METHOD OF MODIFYING RENDERED ATTRIBUTES OF LIST ELEMENTS IN A USER INTERFACE

(71) Applicant: RESEARCH IN MOTION LIMITED, Waterloo (CA)

(72) Inventors: Erik Magnus Månsson, Malmö (SE); Glenn Eric Kennard, Malmö (SE); Nils Fredrik Trobro, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 176 days.

(21) Appl. No.: 13/654,039

(22) Filed: Oct. 17, 2012

(65) Prior Publication Data

US 2013/0097539 A1 Apr. 18, 2013

Related U.S. Application Data

(60) Provisional application No. 61/548,641, filed on Oct. 18, 2011.

(51) Int. Cl.
| | |
|---|---|
| *G06F 3/048* | (2013.01) |
| *G06F 3/0482* | (2013.01) |
| *G06F 3/0485* | (2013.01) |
| *G06F 3/0488* | (2013.01) |

(52) U.S. Cl.
CPC ............ *G06F 3/0482* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| 5,528,739 | A | 6/1996 | Lucas et al. | |
|---|---|---|---|---|
| 7,479,949 | B2* | 1/2009 | Jobs et al. | 345/173 |
| 7,703,045 | B1* | 4/2010 | Kawahara et al. | 715/853 |
| 2004/0100479 | A1* | 5/2004 | Nakano et al. | 345/700 |
| 2007/0189737 | A1 | 8/2007 | Chaudhri et al. | |
| 2007/0211022 | A1 | 9/2007 | Boillot | |
| 2007/0226641 | A1* | 9/2007 | Johnson et al. | 715/767 |
| 2008/0005703 | A1* | 1/2008 | Radivojevic et al. | 715/863 |
| 2008/0122870 | A1 | 5/2008 | Brodersen et al. | |

(Continued)

FOREIGN PATENT DOCUMENTS

| EP | 1148412 A2 | 10/2001 |
|---|---|---|
| EP | 1148412 A3 | 10/2001 |
| GB | 2461757 | 1/2010 |

OTHER PUBLICATIONS

Office Action mailed Apr. 28, 2014; in corresponding Canadian patent application No. 2,792,685.

(Continued)

*Primary Examiner* — Matt Kim
*Assistant Examiner* — Hua Lu
(74) *Attorney, Agent, or Firm* — Fish & Richardson P.C.

(57) ABSTRACT

A method of modifying attributes of list elements in a layout space of the list as the list scrolls in a user interface is disclosed herein. The method comprises determining a series of location values of each list element for a duration of a scroll event. Additionally, for each list element, at each determined location value of that list element, the attributes of that list element are determined by evaluating a set of spline curves associated with that list element based on that location value. The list elements are re-rendered in accordance with the determined attributes for the duration of the scroll event.

25 Claims, 14 Drawing Sheets

(56) References Cited

U.S. PATENT DOCUMENTS

| | | |
|---|---|---|
| 2008/0155473 A1 | 6/2008 | Duhig |
| 2009/0139778 A1 | 6/2009 | Butler et al. |
| 2011/0197152 A1* | 8/2011 | Assadollahi .................. 715/764 |
| 2011/0242135 A1* | 10/2011 | Koshimae ..................... 345/637 |
| 2012/0044251 A1* | 2/2012 | Mark et al. ................... 345/474 |
| 2012/0144333 A1* | 6/2012 | Shatalin et al. .............. 715/771 |
| 2012/0183233 A1* | 7/2012 | Ergan et al. .................. 382/233 |

OTHER PUBLICATIONS

Extended European Search Report mailed Apr. 24, 2014; in corresponding European application No. 12188896.0.
Communication Pursuant to Article 94(3) EPC dated Mar. 6, 2015; 7 pages (43354-EP-EPA).
Donald H. House; "Chapter 14: Spline Curves"; Apr. 14, 2014; XP55170751; Retrieved Feb. 19, 2015 from the Internet: URL:http://people.cs.clemson.edu/~dhouse/courses/405/notes/splines.pdf.

* cited by examiner

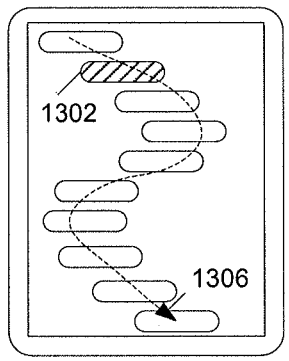 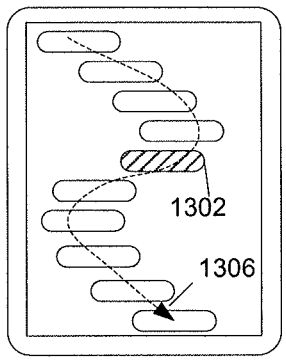 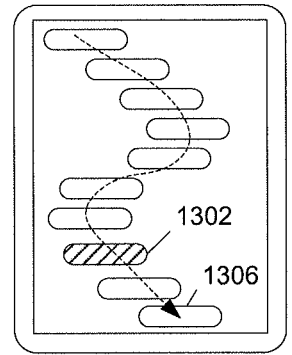
FIG. 13A  FIG. 13B  FIG. 13C
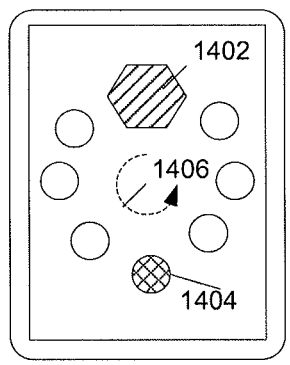 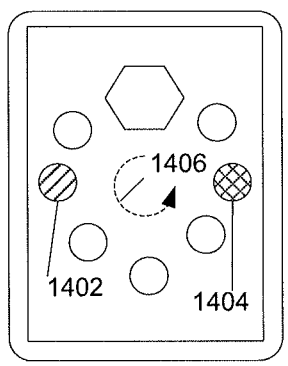 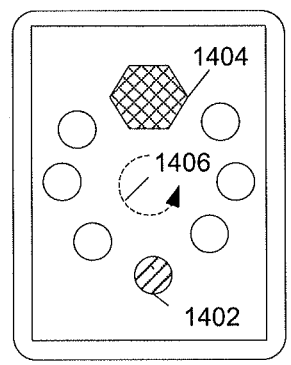
FIG. 14A  FIG. 14B  FIG. 14C

METHOD OF MODIFYING RENDERED ATTRIBUTES OF LIST ELEMENTS IN A USER INTERFACE

CROSS-REFERENCE TO RELATED APPLICATION

This application claims priority to U.S. Provisional Application No. 61/548,641, filed Oct. 18, 2011, which is entirely incorporated by reference herein.

FIELD OF TECHNOLOGY

The present disclosure relates to electronic devices including, but not limited to, portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices comprise several types of devices including mobile stations such as simple cellular telephones, smart telephones, Personal Digital Assistants (PDAs), tablet computers, and laptop computers, that may have wireless network communications or near-field communications connectivity such as Bluetooth® capabilities. In addition, electronic devices are also widely used in personal entertainment and infotainment systems, for example, portable media players and automobile infotainment systems.

The popularity of electronic devices is driven by user experiences and the interaction between people and the devices via user interfaces. User Interfaces (UIs) that are user friendly and intuitive, functional and stylish, vivid and life-like drive the attractiveness of the device to a consumer.

Improvements in the method of generating and presenting user interfaces are desirable.

BRIEF DESCRIPTION OF THE DRAWINGS

Embodiments of the present disclosure will now be described, by way of example only, with reference to the attached Figures, wherein:

FIGS. 13A to 13C illustrate example views of a scrollable liner list at various points during a scroll event, according to an embodiment;

FIGS. 14A to 14C illustrate example views of a scrollable circular list at various points during a scroll event, according to an embodiment.

DETAILED DESCRIPTION

Figure 1:
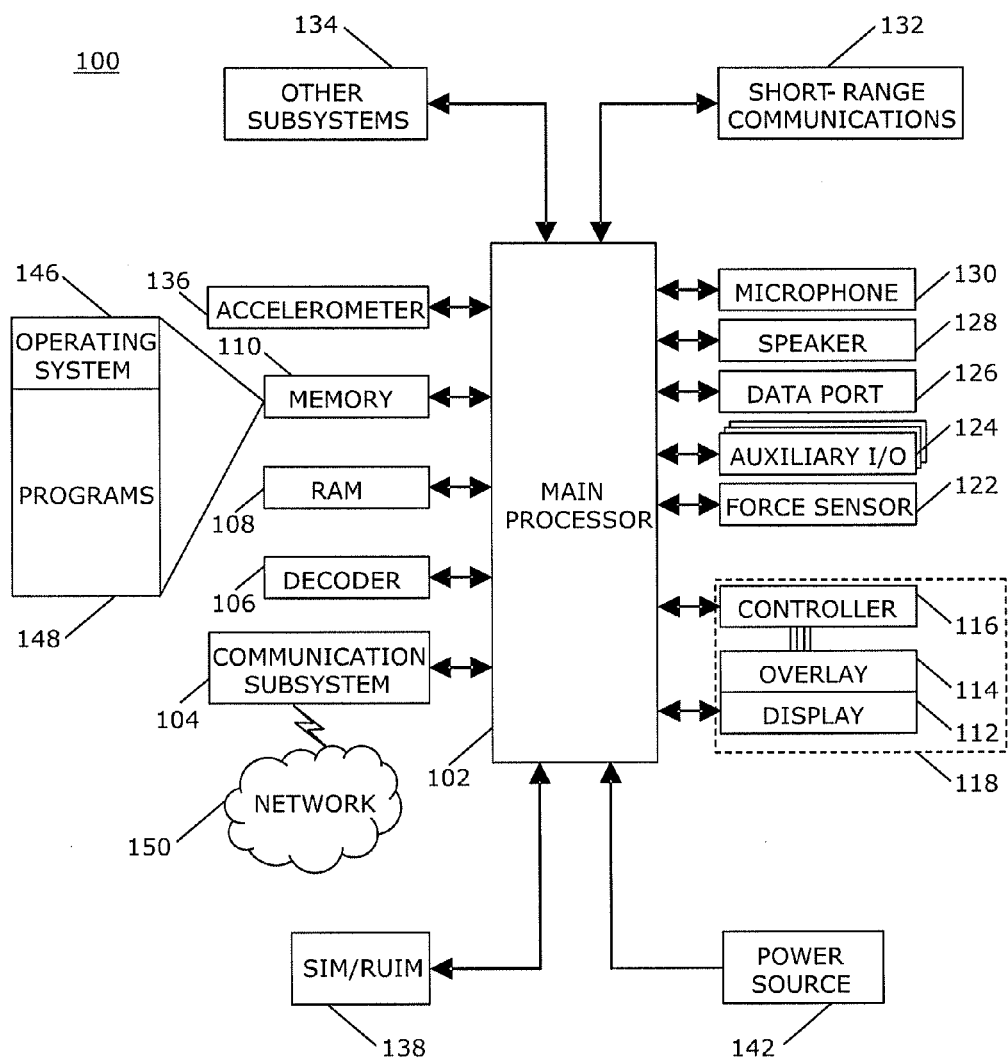
FIG. 1 is a block diagram of a portable electronic device in accordance with an example embodiment.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include wireless communication devices such as pagers, mobile or cellular phones, smartphones, wireless organizers, PDAs, notebook computers, netbook computers, tablet computers, and so forth. The portable electronic device may also be a portable electronic device without wireless communication capabilities. Examples include handheld electronic game device, digital photograph album, digital camera, notebook computers, netbook computers, tablet computers, or other device. The electronic devices may also be a device used in personal entertainment and infotainment systems, for example, portable media players and automobile infotainment systems.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation or movement of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 118 is a capacitive touch-sensitive display which includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact, known as the centroid. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches are detected.

One or more gestures are also detected by the touch-sensitive display 118. A gesture is a particular type of touch on a touch-sensitive display 118 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 114 to initialize the gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the gesture, a horizontal movement of the detected object from the origin point to an end point towards the bottom or top of the touch-sensitive overlay 114 while maintaining continuous contact with the touch-sensitive overlay 114, and a breaking of contact with the touch-sensitive overlay 114.

Swipes can be of various lengths, can be initiated in various places on the touch-sensitive overlay 114, and need not span the full dimension of the touch-sensitive overlay 114. In addition, breaking contact of a swipe can be gradual in that contact with the touch-sensitive overlay 114 is gradually reduced while the swipe is still underway.

Meta-navigation gestures may also be detected by the touch-sensitive overlay 114. A meta-navigation gesture is a gesture that has an origin point that is outside the display area of the touch-sensitive overlay 114 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 114. Thus, two fingers may be utilized for meta-navigation gestures. Further, multi-touch meta-navigation gestures may be distinguished from single touch meta-navigation gestures and may provide additional or further functionality.

In some example embodiments, an optional force sensor 122 or force sensors is disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
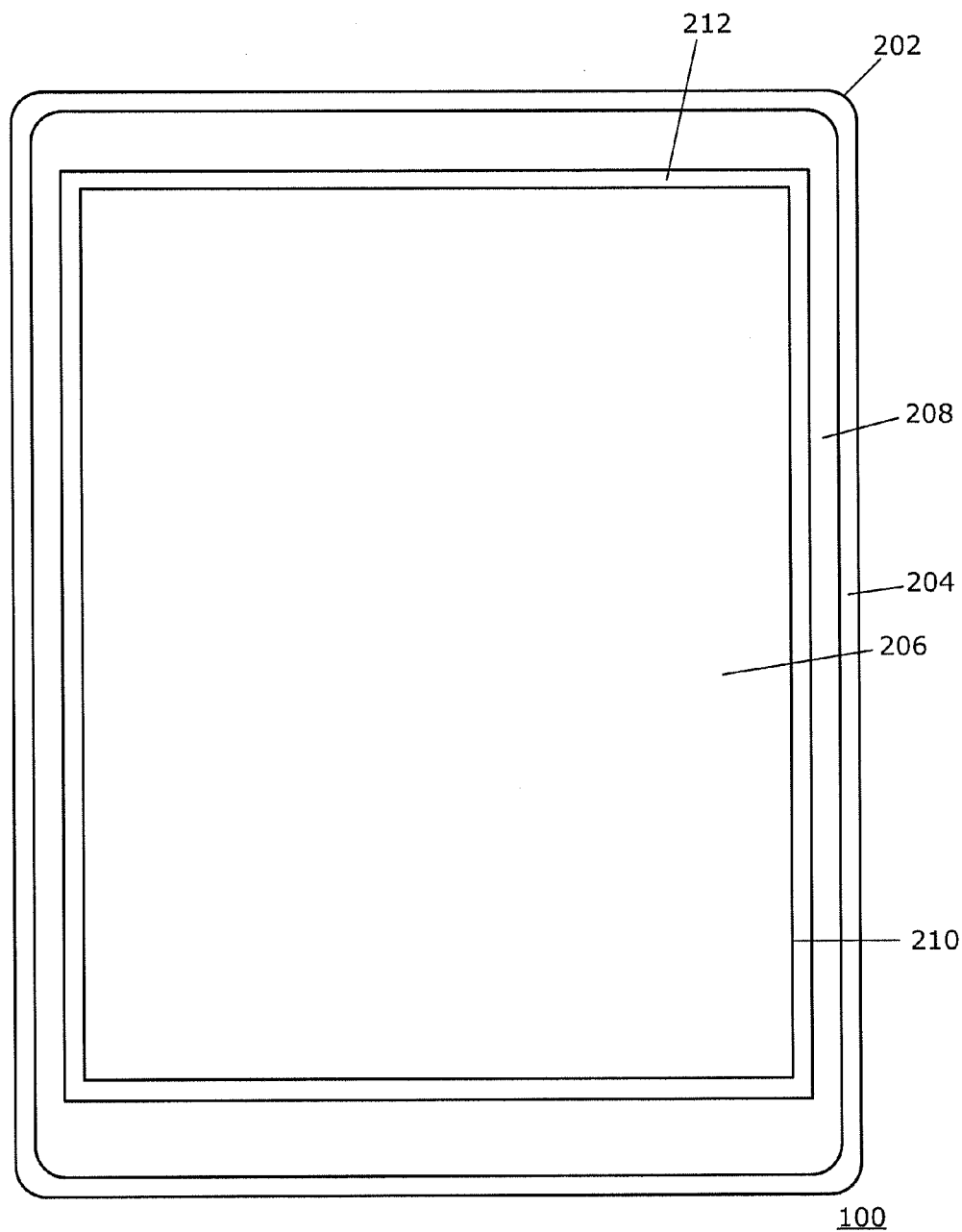
FIG. 2 is a front view of an example of a portable electronic device.

A front view of an example of the portable electronic device 100 is shown in FIG. 2. The portable electronic device 100 includes a housing 202 that encloses components such as shown in FIG. 1. The housing 202 may include a back, sidewalls, and a front 204 that frames the touch-sensitive display 118.

In the shown example of FIG. 2, the touch-sensitive display 118 is generally centered in the housing 202 such that a display area 206 of the touch-sensitive overlay 114 is generally centered with respect to the front 204 of the housing 202. The non-display area 208 of the touch-sensitive overlay 114 extends around the display area 206. A boundary 210 between the display area 206 and the non-display area 208 may be used to distinguish between different types of touch inputs, such as touches, gestures, and meta-navigation gestures. A buffer region 212 or band that extends around the boundary 210 between the display area 206 and the non-display area 208 may be utilized such that a meta-navigation gesture is identified when a touch has an origin point outside the boundary 210 and the buffer region 212 and crosses through the buffer region 212 and over the boundary 210 to a point inside the boundary 210. Although illustrated in FIG. 2, the buffer region 212 may not be visible. Instead, the buffer region 212 may be a region around the boundary 210 that extends a width that is equivalent to a predetermined number of pixels, for example. Alternatively, the boundary 210 may extend a predetermined number of touch sensors or may extend a predetermined distance from the display area 206. The boundary 210 may be a touch-sensitive region or may be a region in which touches are not detected.

The electronic device 100 may also include an object sensor and a motion sensor (both not shown) in communication with the processor 102. The object sensor detects movement of an object relative to the electronic device during a period of contactless object movement. The motion sensor detects motion of the device during the period of contactless object movement. The processor, which may be configured as a gesture determinator, is configured to determine a gesture that corresponds to the movement of the object and to the movement of the device during the period of contactless object movement. In an example embodiment, the processor may be configured to compensate for the device movement when determining the gesture, such as by subtracting the device movement from the object movement. Thus, a more accurate determination of an intended gesture, such as a three-dimensional gesture can be made.

Detection of gestures relative to the device, such as above the display 112, allows for enhanced user interface (UI) functionality. However, if the device 100 is held in one hand of a user and the gesture is made or caused by the user's other hand, movement of the device may be mistakenly processed and determined to be movement associated with the gesture being made above the device, resulting in an erroneous determination of the gesture. In the present disclosure, the terms "motion" and "movement" are used interchangeably.

A contactless position, or contactless object position, is an object position at which the object is free of contact with the portable electronic device 100. For example, an object is in a contactless object position when the object is free of contact with the display 112. Contactless object movement is an object movement during which the object is free of contact with the device 100. A contactless gesture is based on contactless object movement. For example, a contactless gesture can include a contactless object movement above the display 112 of the device 100, without making contact with the display 112. Contactless object position and movement is in contrast to a gesture made on the display 112, such as the type of gesture typically associated with a device having a touch-sensitive display.

A three-dimensional gesture includes a gesture associated with movement that has at least one component in an axis or plane additional to the plane of the display 112 of the device 100. A standard gesture on a touch-sensitive display can include movement in the x and y axes and can also include contributions based on time delay, force intensity, and other factors. A three-dimensional gesture is a gesture performed relative to the device 100, such as above the display 112 in the z axis. Adding a further z axis component to a gesture can expand the number, type and variation of gestures that can be used to control the device 100. In example embodiments described herein, a contactless three-dimensional gesture is performed relative to the device 100 without making contact with the display 112.

In some example embodiments, the three-dimensional gesture is performed relative to the device 100 without making contact with the display 112. In other example embodiments, the three-dimensional gesture includes some contact with the display 112.

Examples of three-dimensional gestures and their determination are discussed in United States Patent Application Publication No. 2008/005703A1 entitled "Apparatus, methods and computer program products providing finger-based and hand-based gesture commands for portable electronic device applications". Other discussions of examples of three-dimensional gestures and their determination are found in the following: United States Patent Application Publication No. 2009/0139778A1 entitled "User Input Using Proximity Sensing"; United States Patent Application Publication No. 2007/02211022A1 entitled "Method and Device for Three-Dimensional Sensing". Each of these documents is incorporated herein by reference.

Typically, users interact with electronic devices with touch-sensitive displays via user interfaces (UIs), e.g. graphical user interfaces (GUIs). UIs may be rendered on the display prior to or after the detection of touch events by the touch-sensitive display 118. For example, when running a web browser application on the electronic device 100, the contents of a web page may be displayed on the display 112. Once the contents of the webpage have been rendered (or loaded) on the display 112, the UIs may not be displayed until the touch-sensitive display 118 detects a touch event, e.g., a user wanting to scroll down the contents (a scroll bar UI may then be rendered on the display), move away from the web page (the URL input area may be rendered on the display), or close the web browser application (a UI to close, minimize, adjust the size of the browser may be rendered on the display). In some instances, actions may be taken by the processor 102 without the rendering of UIs, e.g., a pinch gesture for zooming out, a flick gesture for turning a page on a reader application, etc.

UIs may be generally visualized as a graphical scene comprising elements or objects (also referred to as entities). Data structures known as scene graphs may be used to define the logical and/or spatial representation of a graphical scene. A scene graph is a collection of nodes in a graph or tree structure. The elements or objects of a UI may be represented as nodes in the scene graph. A node in a scene graph may have many children. The parent node of a scene graph that does not itself have a parent node corresponds to the overall UI.

Consequently, an effect applied to a parent is applied to all its child nodes, i.e., an operation performed on the parent of a group (related by a common parent) automatically propagates to all of its child nodes. For example, related objects/entities may be grouped into a compound object (also known as a layout), which may by moved, transformed, selected, etc., as a single group. In general, a layout can be any grouping of UI elements or objects. The term "container" as used herein refers to layouts that group UI elements in a particular ordered manner. A parent node can have one or more child nodes that can be, for example, any type of layout including a container.

Each container can in turn have its own child nodes, which may be, for example, other container nodes, basic UI elements or special effect nodes. The basic UI elements correspond to discrete components of the UI such as, for example, a button or a slider. A leaf node in a scene graph corresponds to a basic UI element. A leaf node does not have any child nodes.

As mentioned above, containers are layouts that group interface elements in a particular ordered manner. Containers can be of various types, including but not limited to, docking containers, stacking containers, grid-based containers, and scrolling containers.

A docking container refers to a layout that permits its children to dock to the edges of other items in the layout.

A stacking container refers to a layout that stacks its child components. The child components can be stacked, for example, vertically or horizontally. A stacking container dynamically recalculates the layout as changes occur to its children. For example, if the size of or number of its children changes then the layout is recalculated. This can occur in, for example, dynamically sized lists.

A grid container refers to a layout that orders its children in a grid structure.

A scrolling container refers to a layout that is used to scroll its contents if the number of items in the layout is too great to fit inside the layout.

Figure 3:
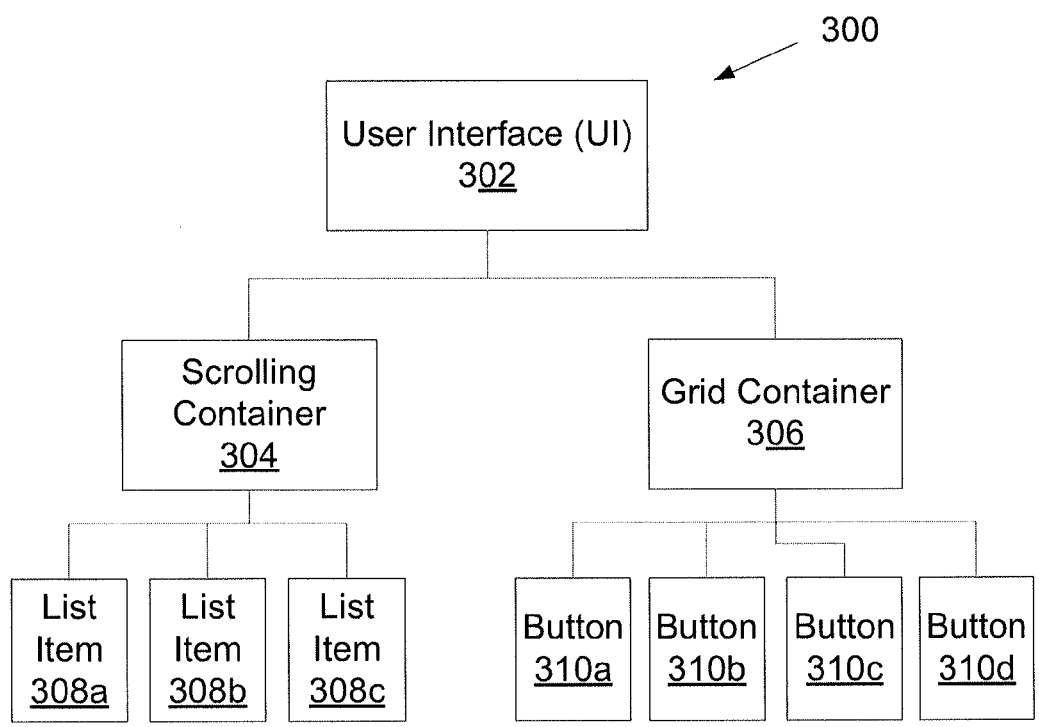
FIG. 3 is an illustration of a schematic diagram of a scene graph associated with an UI.

FIG. 3 illustrates a schematic diagram of a scene graph 300. Scene graph 300 comprises a parent node 302, which has two child nodes 304 and 306. Child node 304 has three child nodes 308a to 308c, each of which is a leaf node. Child node 306 has four child nodes 310a to 310d, each of which is a leaf node.

Child node 304 is a scrolling container and is used to represent a list. Each item in the list is represented by one of nodes 308a to 308c. Child node 306 is a grid container and is used to represent a number of buttons ordered in a grid configuration. Accordingly, each of nodes 310a to 310d represent buttons. Accordingly, the overall user interface represented by parent node 302 has a list, which is represented by child node 304, and a set of buttons arranged in a grid pattern, which is represented by child node 306.

In addition, animation nodes are nodes that are used to create animation in a UI. Animation nodes are of various types, including but not limited to, special effects nodes and particle system effects.

Examples of special effect nodes include, but are not limited to, kernel effects, pixel effects, water effects, blob effects and image fade effects.

Kernel effects are based on more than one pixel. Examples include blur and sharpen effects. Pixel effects are performed on all pixels in an area. Examples include colorizing a set of pixels and the saturating a set of pixels. Water effects include distortion effects that resemble water such as, for example, a rippled surface. Blob effects include various types of displacement effects that resemble liquid behaviour. Image fade effects are used to perform transition effects.

Particle system effects are used to create a wide range of organic user interface effects such as sparkles, smoke, fire, star fields, and lava. The behaviour and properties of the particles such as, direction, lifetime, number, velocity, randomness can be selected and controlled. All elements in the UI may be treated as particles. In addition, the particles can have a z-value (in addition to x- and y-values) that can be used with perspective computations to provide a three-dimensional look to the UI.

Figure 4:
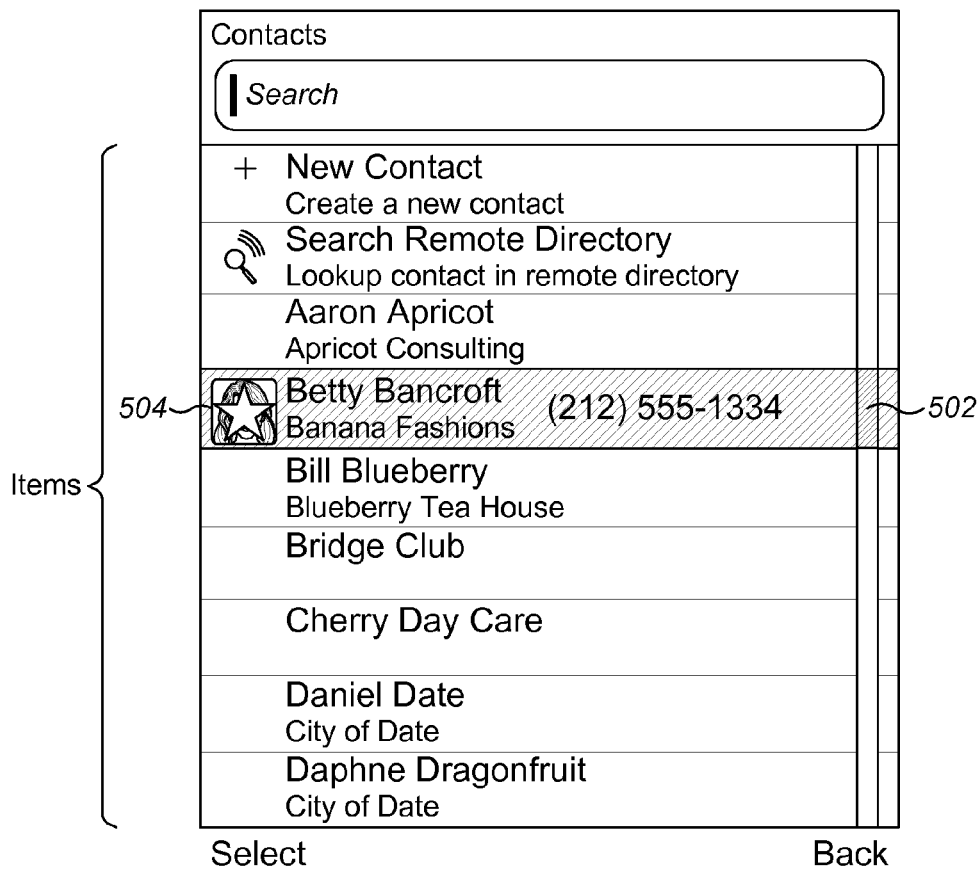
FIG. 4 is a graphical user interface (GUI) displayed on the display of the portable electronic device.

FIG. 4 shows a graphical user interface (GUI) displayed on the display 112 of the electronic device 100. The GUI indicates that a Contacts List application is running on the electronic device. The GUI is a listing (a partial listing) of entries in the contacts list; these entries constitute data items that are (can be) displayed. At the right of the GUI is a cursor 502 that can be moved vertically to scroll through the listing of entries. At the bottom of the GUI are a select button and a back button to respectively select an highlighted item 504 and navigate to a previous GUI. In this example, which uses the tree structure of FIG. 4, the Contacts List application is programmed to change the GUI in order to show a picture and the phone number of the highlighted contact 504.

Figure 5:
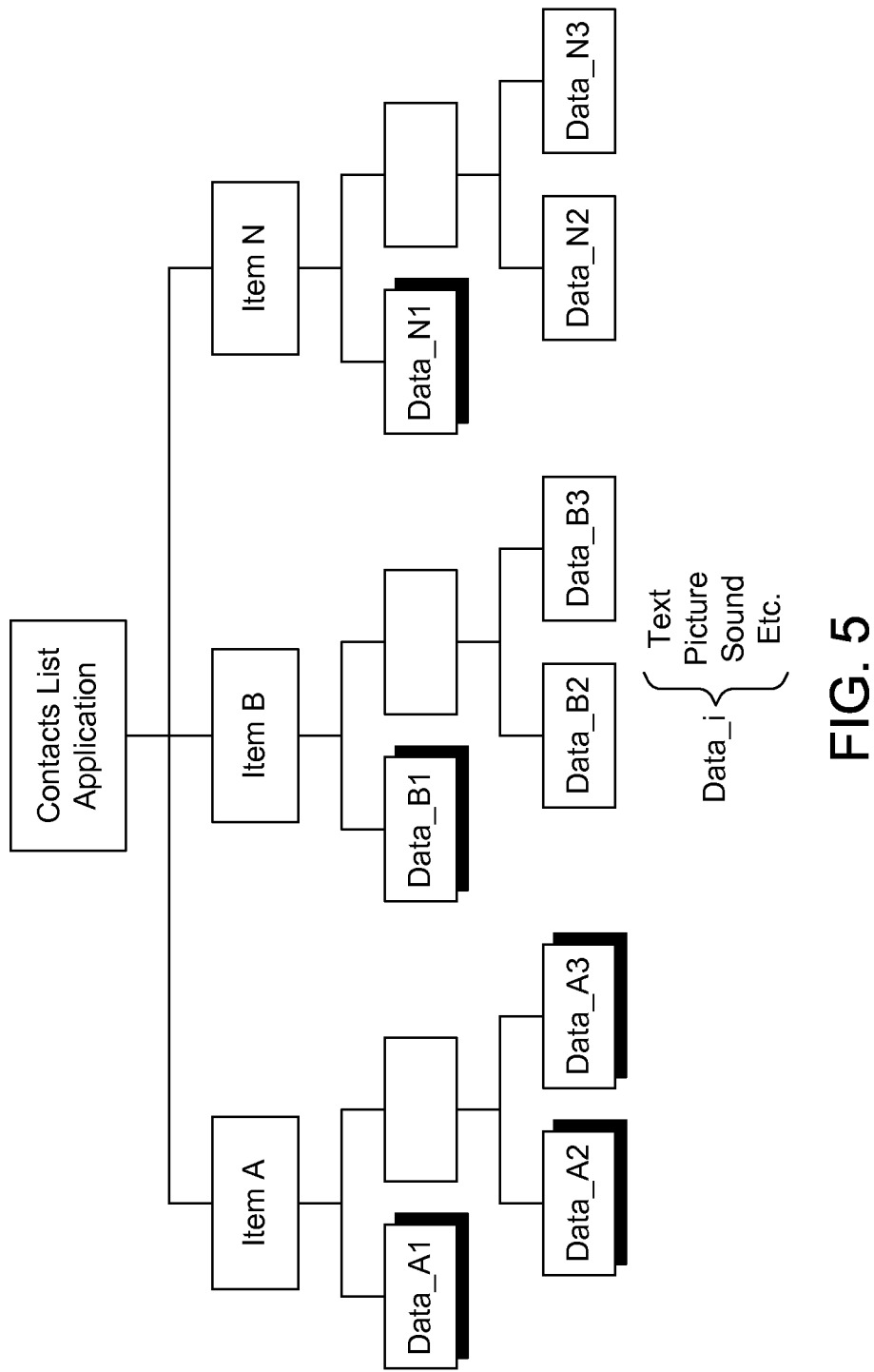
FIG. 5 illustrates a general UI tree structure representative of the GUI shown in FIG. 4.

FIG. 5 shows a general UI tree structure, or component tree, representative of the GUI shown in FIG. 4. In FIG. 5, item A, item B, . . . , and item N each have associated UI data items data_x1, data_x2, and data_x3, with x being equal to A, B, or N. In the example of FIG. 5, data_x1 corresponds to a first text array (name), data_x2 corresponds to a second text array (telephone number), and data_x3 corresponds to a picture of the contact. However, the data items can be associated with any suitable type of data (text, picture, sound, etc). The shadowed boxes represent data items displayed on the GUI of FIG. 4.

According to known methods, the GUI of FIG. 4 is rendered according to the tree structure of FIG. 5 as follows. The Contacts List application is initialized by the operator of the electronic device and the Contacts List application determines to which items it is associated. Subsequently, the Contacts List application determines the visibility state of the items; i.e., the application determines if the items are to be visible, partially visible, or non-visible. In the example of FIG. 5, the items data_A1 (name), data_A2 (telephone number), data_A3 (picture), data_B1 (name), and data_N1 (name) are determined to be visible. After having made that determination, the Contacts List application retrieves application data and graphical display data only for items that are in the visible state.

A disadvantage of the approach outlined above is that the rendering of the GUI can be slowed down or appear jerky because the application itself (e.g., the Contacts List application) has to control both the application data and the graphical display and cannot update the rendered GUI until it has collected all the data.

Conventionally, as described above, UIs are developed for individual applications by the application developers with limited or no consistency between the UIs for different applications. In addition, UI development may be a cumbersome, time- and labor-intensive process. Once a significant amount of resource has been expended in developing application-specific UIs, there is little motivation or room for tailoring the UIs merely to enhance user experiences. Consequently, user experience is compromised.

For example, in conventional systems, an application is responsible for driving its UI. The application creates the UI elements, composites them into a complete UI screen and is responsible for displaying them. The actual rendering is often handled by the UI framework (e.g., calling the draw function for all widgets on the screen), but most of the code related to the UI is within the application. It is the responsibility of the application to collect the requisite data for each UI and to populate the UI. The data flow in the system is therefore driven by the applications, leading to a large amount of UI-related code in the application that is both difficult to maintain and customize.

Figure 6:
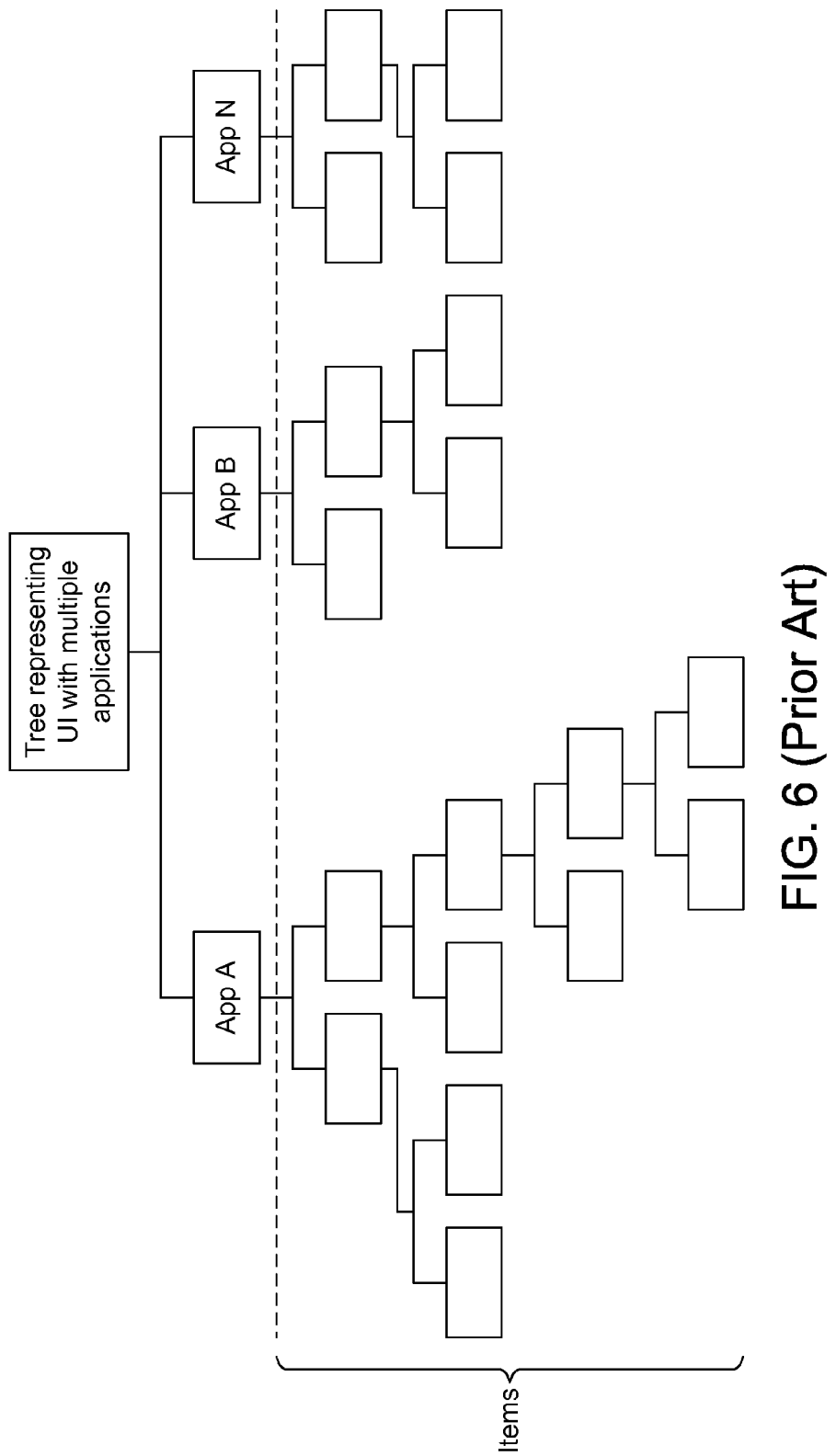
FIG. 6 is an illustration of a tree structure representing a UI with multiple applications.

FIG. 6 shows a tree representation of a UI to which multiple applications are associated. The UI represented at FIG. 6 can have, for each of the multiple applications, a UI element or item, or several elements or items, that can be rendered on the display 112 of the electronic device 100.

As in the example of FIG. 5, the tree representation of FIG. 6 is used to composes a scene to be rendered on the display by populating empty elements in the tree. As will be appreciated, conventional UI frameworks, where each application is responsible for its own UI, make it difficult to achieve a good UI, from the point of view consistency or visual appeal, when multiple applications interact with each other.

Figure 7:
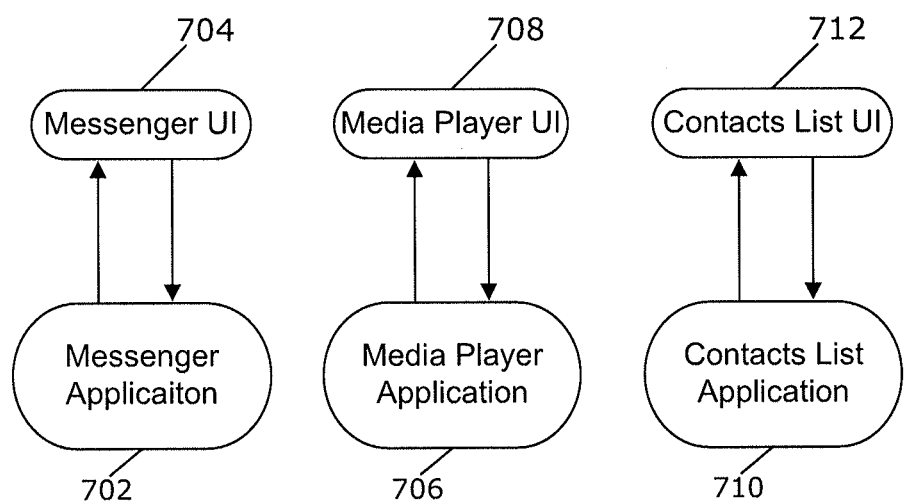
FIG. 7 is an illustration of application driven UI architecture with each application having an associated UI.

For example, when a user wishes to "send a media item in MMS to a specific contact," the process involves UIs from three applications (e.g, Media Player, Messenger and Contact List applications) installed on the electronic device 100 as shown in FIG. 7. The applications may be stored on memory 110 of the electronic device 100. Each application has its associated UI. For example, the Messenger application 702 has an associated Messenger UI 704; the Media Player Application 706 has an associated Media Player UI 708; and the Contacts List Application 710 has an associated Contacts List UI 712. A visually seamless UI is difficult to implement under this scenario.

The method and system described herein provide a UI framework that is independent of device platform (e.g., independent of mobile device architecture and operating system) as well as application framework (e.g., independent of application programming language). The UI framework described herein provides scalability, improved graphical capabilities and ease of customization, and results in enhanced user experiences.

Figure 8:
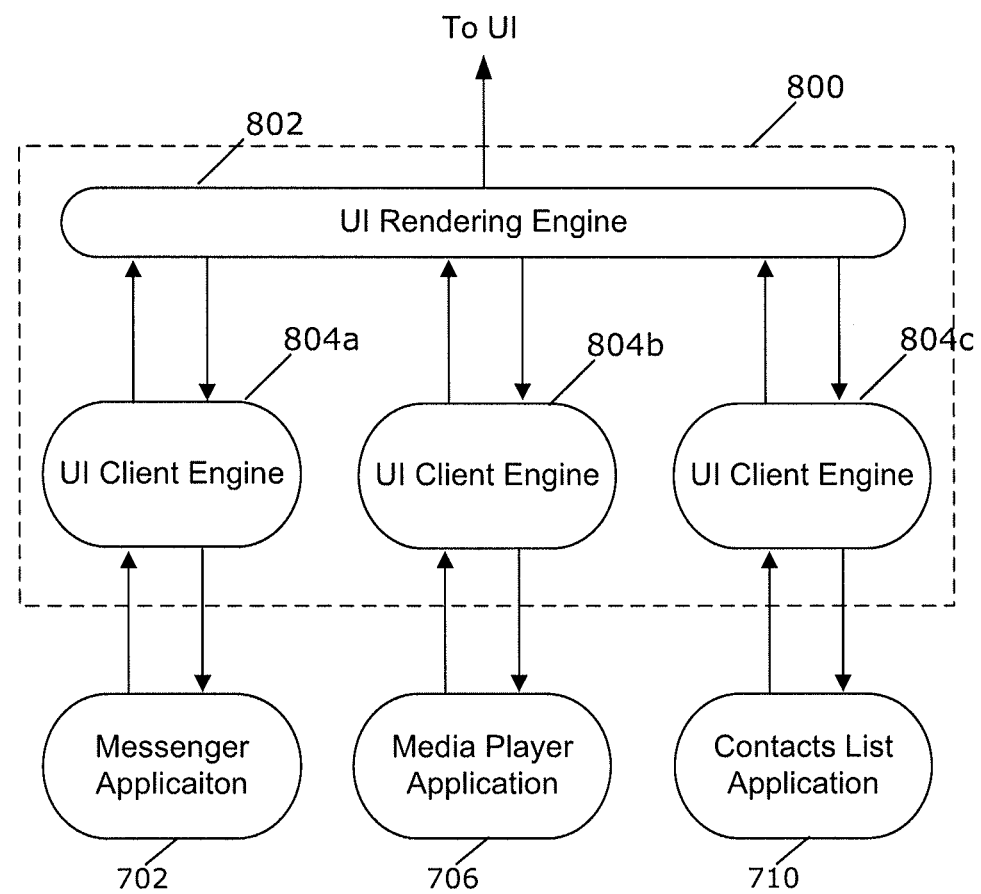
FIG. 8 is illustration of UI driven UI architecture with multiple applications having a seamless UI.

The UI framework is used by applications to render their UIs. The UI framework is itself not an application framework (i.e., is not used for developing applications) and does not impose any rules on application structuring or application management. The UI framework does not provide application functionality. The applications themselves implement the functionality (or business logic) behind the UI. However, using the UI framework removes all UI functionalities from the application code and instead lets the UI control data call functions. Thus, a the UI can interact with multiple applications for data requests in a seamless manner. FIG. 8 illustrates the earlier example of FIG. 7 that uses three different applications, viz., the Messenger Application 702, Medial Player Application 706, and Contacts List Application 710, but a single UI framework 800, having a UI rendering engine 802 and UI client engines 804a, 804b, and 804c associated with each application 702, 706 and 710, to provide the UI tools for "sending a media item in MMS to a specific contact."

The single UI framework 800 described herein enforces a clear separation between UI visualization, UI logic, and UI data thereby allowing the creation of a seamless and truly rich UI. The applications are reduced to simple services, responsible for performing business logic and provide the data that the UI requests. An advantage of the single UI framework is that it allows that UI designer to create any user scenario without having to account for the applications that are currently running on the device. That is, the UI is driving the data flow. If there is a list on the screen displaying the contacts, there will be requests for data to the Contacts List application. The UI designer can readily use any application available on the device for its UI without having to specifically create or implement UI elements and populate the lists. Consequently, this architecture enables seamless cross application scenarios such as the example shown in FIG. 8.

Figure 9:
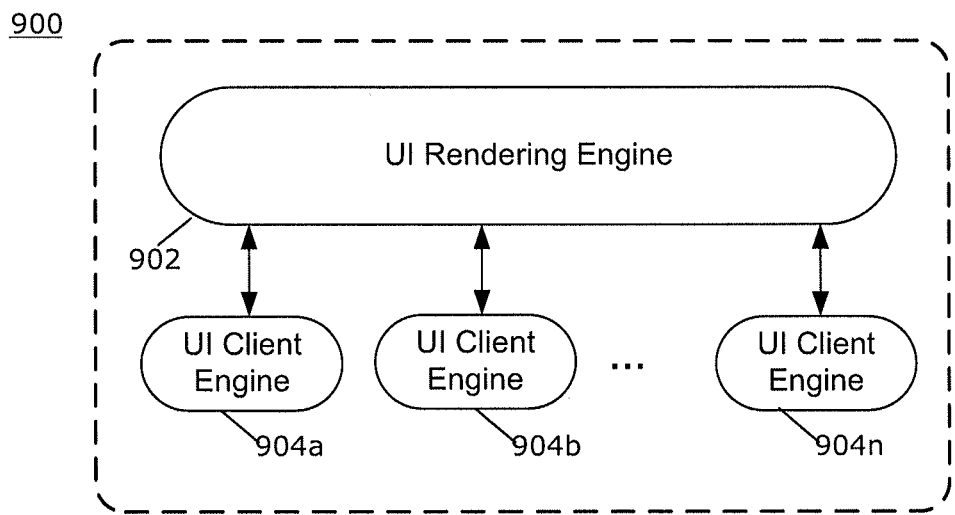
FIG. 9 is a schematic representation of the modules of the UI driven UI architecture of FIG. 8.
Figure 10:
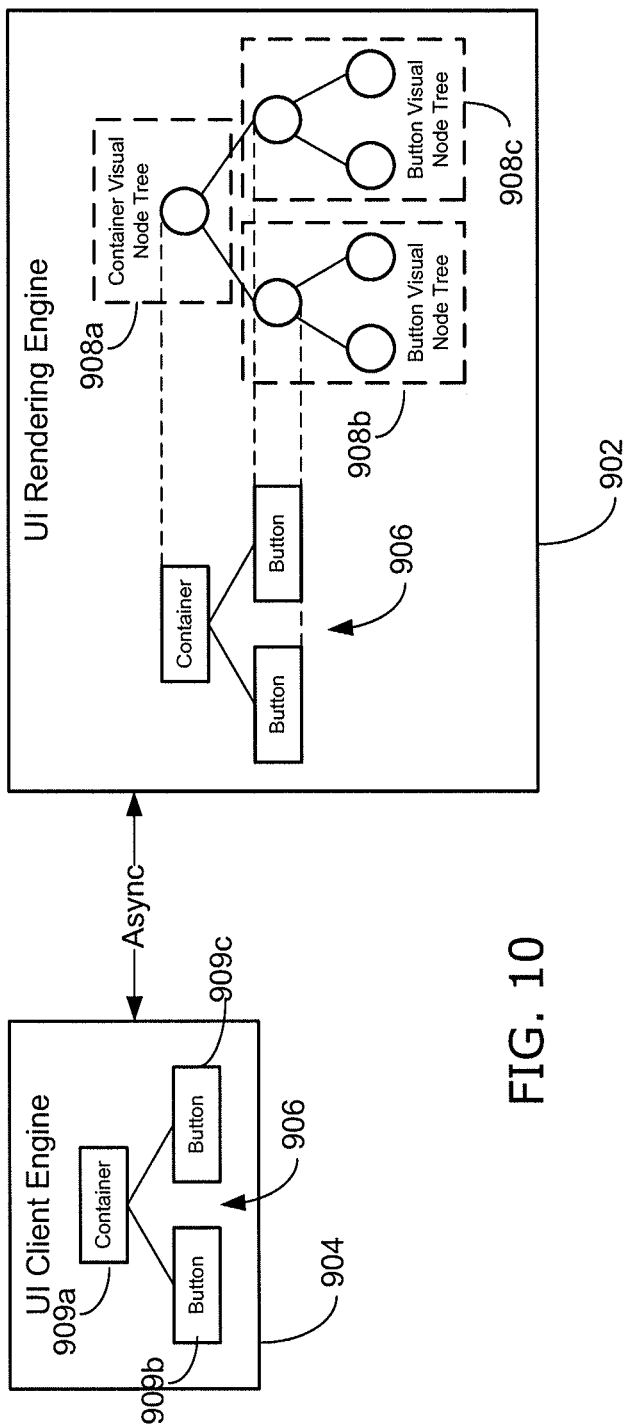
FIG. 10 is a block diagram of a UI client engine and a UI rendering engine.

As noted above, the UI framework 800 described herein comprise multiple modules or engines: typically, a single UI rendering engine 902 for a device or a display; and separate UI client engines 904a, 904b, . . . 904n associated with separate applications, as shown in FIG. 9. Each of these modules is described in further detail below with reference to FIG. 10.

Each UI client engine 904 is responsible for providing UI data from its associated application to the UI rendering engine 902. The UI client engine 904 is responsible for setting up UI component trees and informing the UI rendering engine 902 of the tree structure 906. The UI client engine 904 gets this information from the application. For example, the application code could specify the creation of elements, such as buttons and containers, programmatically in a language such as C++, or the application could describe the tree in a declarative language, such as XML, and have the UI client engine load it.

The UI rendering engine 902 mirrors the tree 906 set up by UI client engine 904. UI rendering engine 902 sets up visual node trees 908a, 908b, 908c for each UI element 909a, 909b, 909c of the UI component tree 906. To set up the visual node trees, the UI rendering engine 902 has predefined visual node trees for each UI component that the UI client engine 904 provides. For example if the UI client engine 904 sets up a Button, the UI rendering engine 902 will have a predefined visual node tree for Button which it will use. Typically, this predefined visual node tree will be described in a markup language, such as XML, but it could also be described in programmatic code, such as an API. The visual node trees are used for rendering the elements (for example the background, foreground and highlight images of a button is represented in the visual node tree 908b). The UI client engine 904 is not aware of the visual node trees.

The UI rendering engine 902 handles the logic and event handling associated with the UI elements that composite the UI (e.g., lists, menus, softkeys, etc.). The UI rendering engine 902 receives data from the UI client engine in an asynchronous manner, and binds the data to its visual nodes in the visual tree. As used herein "asynchronous" means that the transmission of data from the UI client engine 904 to the UI rendering engine 902 is independent of processing of data, or inputs, by the application. All data that can be presented in the UI for processing as a single thread is made available to the UI rendering engine 902 as it is available to the UI client engine 904. The underlying application processing and data sources behind the UI client engine are hidden from the UI rendering engine 902. The UI client engine 904 and UI rendering engine 902 can execute separate threads without waiting for responses from each other. In this manner, the UI rendering engine 902 can render the UI tree (using the visual node tree) without being blocked or stalled by UI client engine 904.

Since the UI client engine 904 sends data to the UI rendering engine 902 as it becomes available, the UI client engine 904 must also indicate to the UI rendering engine 902 whether the data is complete, or to await further data prior to rendering. In an example implementation, the data items necessary for rendering the UI form a "transaction." Rather than waiting until all required data items are available, the UI client engine 904 can send data items relating to a single transaction in several communications or messages as they become available, and the messages will be received asynchronously by the UI rendering engine 902. The UI rendering engine 902 does not start processing the received data items until it has received all messages that at are part of the transaction. For example, the UI client engine 904 can inform the UI rendering engine 902 that one container with two child buttons has been created as one transaction. The UI rendering engine 902 does not process this transaction until it has received all data items related to the particular transaction; in other words, the UI rendering engine will not create the container and buttons before it has all the information.

The UI client engine module 904 and the UI rendering engine 902 are as decoupled from each other as possible. The UI client engine 904 is not aware of where in the UI its data is used, i.e., it does not hold a UI state.

The elements are the building blocks of the UI. The elements of the UI component tree represent the basic UI elements, lists, menus, tab lists, softkeys, etc. Elements are typically specified in a declarative language such as XML or JSON (currently QML which is JSON based), and given different attributes to make them behave as desired.

Examples of attributes include, but are not limited to, rendered attributes, response attributes, and decoding attributes. Rendered attributes refers to any attribute that specifies how a UI element is rendered. Examples of rendered attributes can include, but are not limited to color, opacity/transparency, the position on the display, orientation, shape, and size. In various embodiments, the position on the display can be described with any suitable coordinate system including (x,y) coordinates or (x,y,z) coordinates. The term color can include, but is not limited to, a luminance, hue, or saturation.

Examples of response attributes can include any attribute that specifies how the user interface element responds to commands or inputs, such as for example, but not limited to a single tap, double tap or swipe. For example, a response attribute can specify a speed of a double tap for the UI element.

Decoding attributes can include, but are not limited to, image decoding priority.

A complete UI is a set of elements composited in a visual tree. The elements interpret their associated data—for example, a menu component will interpret the data differently from a list component. The elements react upon events—for example, when a key is pressed or other event is posted to the UI, the elements in the UI will react, e.g., move up and down in a list or opening a sub menu. The elements also bind data to their respective visual tree nodes. The elements have built in UI logic (such as "highlight when pressed", "scroll when flicked", "navigate to tab 3 when tab 3 icon is clicked"), but the application logic (such as "start new application", "find shortest route to bus station", etc.) is in the application code, and typically is triggered by high level events from the elements (e.g. a "Button Click" event detected by the UI rendering engine 902, and passed to the UI client engine 904, may trigger the application to "find shortest route").

Visuals define the appearance of elements, and are specified in the visual node trees. In an example, the visuals may be defined in XML. The XML could be generated independently or using a suitable visuals generation application. A visual could, for example, be a generic list that can be used by several different lists or a highly specialized visualization of a media player with a number of graphical effects and animations. Using different visual representations of elements is an effective way to change the look and feel of the UI. For example, skin changes can readily be done simply by changing the visuals of components in the UI.

If the visuals have a reference to a specific data element, the UI client engine 904 retrieves the data from the application and transmits it to the UI rendering engine 902. The UI client engine 904 also initiates animations on visuals. For example, UI client engine 904 can create and start animations on properties of UI elements (position, opacity, etc.). The UI client engine 904 is unaware of the actual composition and structure of its visuals. For example, when a list item receives focus, the list element will assume that there is animation for focusing in the list item visuals. The UI rendering engine 902 executes started animations. Animations run without involvement from the UI client engine 904. In other words, the UI client engine 904 cannot block the rendering of animations.

The UI rendering engine 902 is a rendering engine that may be specifically optimized for the electronic device 100. The rendering engine 902 is capable of rendering a tree of visual elements and effects and performing real time animations. The UI rendering engine 902 renders the pixels that eventually will be copied on to the physical display 112 of the electronic device 100. All elements active on the display have a graphical representation in the visual tree.

UI rendering engine 902 processes touch/key input without UI client engine involvement to ensure responsiveness (for example, list scrolling, changing of slider values, component animations, etc. run without UI client engine involvement).

UI rendering engine 902 notifies UI client engine 904 that a button has been pressed, slider has been dragged, etc. The UI client engine 904 can then react on the event (for example change the brightness if the slider has been dragged), but as already mentioned the UI client engine 904 does not need to be involved in updating the actual UI, only in responding to events from the UI.

Figure 11:
FIG. 11 is an illustration of a runtime behavior of the UI driven UI architecture using a Contacts List application.

The advantages of the UI driven architecture described herein is readily apparent during runtime. Runtime behaviour is defined by what is visible on the display screen of the device. For example, a "Main View" of the Contacts List application is shown in FIG. 11. For a transition from the "Main View" to a "Detailed Contact Information" view, the UI client engine 904 will signal a transition to the UI rendering engine 902. The UI rendering engine 902 will instantiate the visual node tree of the "Detailed Contact Information" elements. The graphics needed by the visuals can be read, for example, from an associated file system, for example, local memory 110 of the electronic device 100. The UI client engine 904 also provides the UI rendering engine 902 with the data for the currently focused contact (i.e., the contact currently selected or highlighted on the display screen among the list of contacts that are currently displayed). The UI client engine 904 can retrieve the necessary data by, for example, calling a data providing API of a contacts list data service, which then provides data items, such as home number, mobile phone number, email, thumbnails, etc. for the contact.

The UI rendering engine 902 populates the visual node tree of the "Detailed Contact Information" elements, and a visual transition between the two screens is started. The UI rendering engine 902 runs and renders an animation associated with the transition. When the transition is complete, the visual node tree of the "Main View" is unloaded and all data bindings associated with the visuals can be released. Thus, the application (e.g., the Contacts List application 710) does not need to drive the UI, it basically only needs to supply the data that the client engine 904 requires to enable the UI rendering engine 902 to render the UI.

A problem with known UI architectures is that they rely on the application to provide information each time the UI re-renders user interface elements. An example would be re-rendering list elements when the list is scrolled. In previous systems, each time a scroll occurred, the application would provide the data required to re-render the list. This can be problematic in that when the application updates the UI it is prevented from performing other functions or vice-versa and therefore a user may experience a lag in response times. Although known systems allow for certain communications to occur in an asynchronous fashion, for example, through the use of caching some data, known systems generally used synchronous data services, which includes communications between the application and the user interface. In contrast to known systems, some embodiments disclosed herein utilize only asynchronous data services.

In embodiments described herein, the UI Rendering Engine 902 initially receives data from the application when first rendering a list. When an event occurs to change the configuration of the list, such as for example a scroll event, the UI Rendering Engine 902 does not require additional information from the application in order to re-render the list.

A scroll event refers to any movement of list elements in a list displayed in the user interface. In various embodiments described herein, the list can be of a variety of types including but not limited to a linear list and circular list. The list can scroll in any suitable manner including but not limited to any linear path across the screen (e.g. up/down, left/right, or diagonally), any two dimensional path, or the list elements can be made to appear to travel over a three-dimensional path. Accordingly, in some embodiments, the list can be made to appear as a three-dimensional conveyor system or display table where the list elements appear as three-dimensional object. In various embodiments, scrolling can also be triggered by programmatic events. For example, a program can cause a contact list to scroll to the first contact starting with a particular letter.

In some embodiments, the list elements in a list can themselves be lists or containers and such list elements may be referred to as parent list elements. The parent list element can have its own list elements or other user interface elements that can be access by selecting the parent list element.

A scroll event can be triggered by any appropriate input including but not limited to, a swipe gesture, tap gesture, a substantially circular gesture, or by shaking the device. In addition, a scroll event can occur when the user drags a list element by, for example, placing his or her finger on the list element and dragging it in a direction of scrolling.

In some embodiments described herein, given that the UI Rendering Engine 902 does not require information from the application in order to re-render the list, the rendering thread and application thread can be separated. In some embodiments, the entire list is sent to the UI rendering engine 902. In some embodiments, only a portion of the list is sent to the UI rendering engine 902. In some such embodiments, as the list is scrolled, the UI rendering engine requests portions of the lists in advance of when they need to be displayed. In various embodiments disclosed herein, the rendering and application threads are allowed to operate independently, without blocking each other and therefore results in a more efficient process. In other words, the processes implemented by UI Rendering Engine 902 and the processes implemented by the application can run independently of each other without holding each other up. In addition, in some embodiments described herein, information passed between the application and the UI Rendering Engine 902 is reduced given that information need only be passed once when the list is first rendered. In addition, given that the UI Rendering Engine 902 need not receive any information from the application, the UI Rendering Engine 902 has a reduced lag when responding to inputs from a user.

In an embodiment, the application defines the list and the list elements that are related to the application. The application also defines one or more spline curves for each of the list elements. The spline curve defines an attribute for the list elements based on a location value of the list elements in a layout space of the list.

It should be understood that the layout space of the list should not be confused with the area of the display on which the user interface is displayed. For example, in some embodiments, the location value of a list element indicates the position of that list element in relation to a viewable portion of the list in the user interface. In various embodiments, at any given time, each list element has a unique location value.

In an example embodiment, list elements are visible when they have a location value between 0 and 1. In the case of a scrollable list, as the list is scrolled, the location value for each list element in that list will change during the duration of the scroll. List elements that are not visible, such as, for example, when they have "scrolled off the screen", will have location values that are less than 0 or greater than 1. An item that is not visible at the start of the scroll event may become visible during the scroll event and an item that is not visible at the start of the scroll event may become not visible during the scroll event. Similarly, an item may not be visible at the start of the scroll event, become visible during the scroll event and then again become not visible at a later point in time during in the scroll event. In some embodiments, the offset between elements is extracted from the items themselves. By determining the offset based on the characteristics of the items, UI rendering engine 902 can render and list elements that are of a variety of different sizes in a single list.

In some embodiments, each list element can have a set of spline curves associated with it that together define a set of attributes that depend on the location value of the item. The attributes are as defined above and can include but are not limited to response attributes, rendered attributes and decoding attributes. In some embodiments, each list element can have a different number of spline curves in the set of spline curves associated with it. In some embodiments, each list element has the same number of spline curves associated with it.

In some embodiments, the UI Rendering Engine 902 manages each layout in the user interface without the support of the application with which the layout is associated. As an example, when the layout is a scrollable list (e.g. a scrolling container), the UI Rendering Engine 902 manages the scrolling of the list and the determination of the position of the list elements for the purpose of rendering the list elements in the user interface. Accordingly, in some embodiments, after the initial rendering of a list, the UI Rendering Engine 902 does not require any further input from the application in order to adjust the list in response to events, such as for example but not limited to scroll events, that alter the display of the list.

In an embodiment, in response to an input that changes the display of the list, the UI Rendering Engine 902 determines the location values for each list element in the internal layout space corresponding to the list for the duration of the event. For example, in response to a gesture that initiates a scroll event, the rending engine determines the location values of the list elements during the scroll.

The UI Rendering Engine 902 determines attributes for each list element based on the location values of the list element and the set of spline curves associated with the list element. The UI Rendering Engine 902 then renders the list elements based on the attributes that are determined. In various embodiments, the UI Rendering Engine 902 performs these functions in discrete steps that provide the appearance of a continuous scroll in the user interface.

In some embodiments, a list element can have one or more of its associated spline curves updated during runtime. For example, in some embodiments, if a list element is selected, it is provided with a new set of spline curves. When the selected list element is unselected (e.g. by selecting a new list element), it is again provided with a new set of spline curves, which can be, for example, the original set of spline curves. The effect of providing list elements with different spline curves when they are selected is to have a selected list element have a different set of attributes and therefore appear to behave differently than an unselected list element.

In some embodiments, each list element is provided with a second set of spline curves for reverse mapping touch inputs to a scroll movement in the layout space. In some embodiments, the reverse mapping is done in order to have the list element stick under a finger when the user intends to drag the list element across the display.

In some embodiments, spline curves can be bounded to OpenGL shader parameters. In some embodiments, this allows for the UI Rendering Engine 902 to generate output that can be used as input to a program that is run on the GPU.

Figure 12:
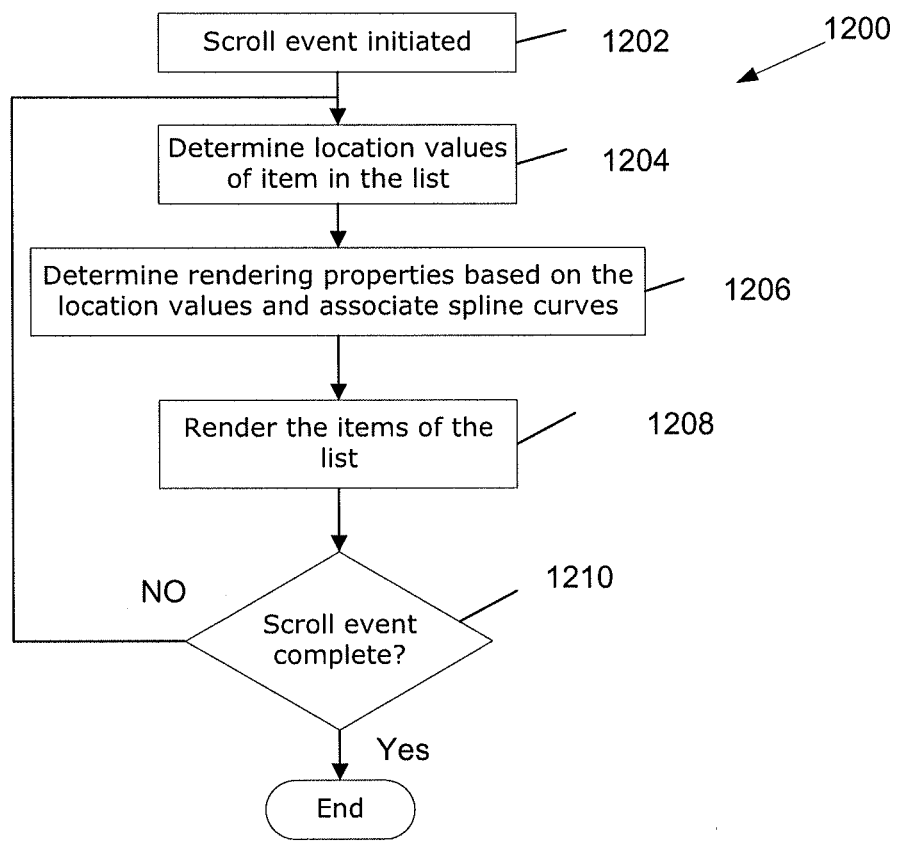
FIG. 12 illustrates a flowchart diagram of a method of modifying attributes of list elements as a list scrolls in a user interface, according to various embodiments.

Reference is now made to FIG. 12, which illustrates a flowchart diagram of a method 1200 of modifying attributes of list elements as a list scrolls in a user interface, according to various embodiments.

At 1202, a scroll event is initiated. In an embodiment, the scroll event is initiated by an appropriate input such as, for example, but not limited to, a touch input. The touch input could be, for example, but is not limited to a swipe gesture for a linear list or a circular motion for a circular list.

At 1204, the UI Rendering Engine 902 determines the location values of the list elements in the layout space of the list based on the scroll event. In some embodiments, the UI Rendering Engine 902 determines a series of incremental changes in the location values of the list elements based on the scroll event.

At 1206, the UI Rendering Engine 902 determines attributes for the items of the list based on the location values of the items and the set of spline curves associated with each item. In various embodiments, each spline curve is a function of the location value and the UI Rendering Engine 902 evaluates each spline curve for the location value determined in 1204.

As mentioned above, in some embodiments, each list element can have a plurality of spline curves associated with it. In such embodiments, at 1206, the UI Rendering Engine 902 evaluates a plurality of spline curves for each list element.

In some embodiments, 1206 is executed only for items that have a location value that corresponds to an on-screen position.

At 1208, the UI Rendering Engine 902 renders the items according to the attributes determined at 1206.

At 1210, the UI Rendering Engine 902 determines if the scroll event is completed. If so, then the method is terminated. If not, then the method repeats 1204.

In some embodiments, the UI Rendering Engine 902 determines a complete set of location values for the scroll event and then determines the complete set of attributes. The UI Rendering Engine 902 then renders each incremental change in location value of visible list elements in order to provide the appearance of a smooth scroll. In other embodiments, the UI Rendering Engine 902 determines the location values and attributes and renders the list elements in an iterative manner for the duration of the scroll event.

Reference is next made to FIGS. 13A to 13B which illustrate example views of a scrollable list at various points during a scroll event. A particular list element 1302 is highlighted to show its (x,y) position in the user interface in each FIG. In FIG. 13A, list element 1302 has a location value of approximately 0.2. In FIG. 13B, list element 1302 has a location value of 0.5. In FIG. 13C, list element 1302 has a location value of approximately 0.8.

In the embodiment illustrated in FIGS. 13A to 13C, each list element is associated with a spline curve that maps the list element's location value to a particular (x,y) coordinate in the display. The spline curves associated with the list elements cause the list scroll along a path indicated by line 1306. Accordingly, each list element in the embodiment illustrated in FIGS. 13A to 13C have the same spline curves for mapping their location value to x and y coordinates on the display causing all the list elements to travel along the same path during a scroll event. In other embodiments, list elements of the same list can be associated with different spline curves that map a given location value to different (x,y) coordinates. In such embodiments, the list elements would travel according to different paths during a scroll event.

It should be understood that a location value of 0.5 does not necessarily relate to a (x,y) position that is near the midpoint of the path that a list item travels along the display of the device. In other words, there need not be a one to one correspondence between a change in location value and a change in (x,y) coordinates. For example, a spline curve can be implemented to cause list items to appear to travel slowly in the first portion of the path and then more quickly in the second portion of the path.

Reference is now made to FIGS. 14A to 14C, which illustrate examples views of a circular list at various points during a scroll event. Two list elements 1402 and 1404 have been highlighted to indicate their position at various points during a scroll event. As can be seen from the FIGS., the spline curves associated with the list elements causes the list elements to move in a circular path indicated by 1406. In addition, the spline curve causes the list elements to have a different size and shape when they are at the top of the list than at other points of the list. In particular, when a list element reaches the top of the list, it has a large hexagonal shape, whereas at other points of the list it has a small circular shape.

Figure 15A:
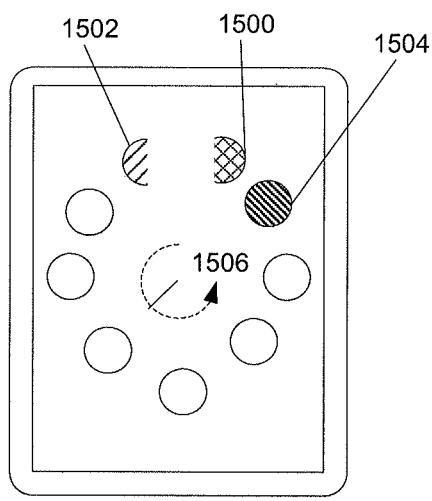
FIGS. 15A and 15B illustrate example views of a second scrollable circular list at various points during a scroll event, according to an embodiment.
Figure 15B:
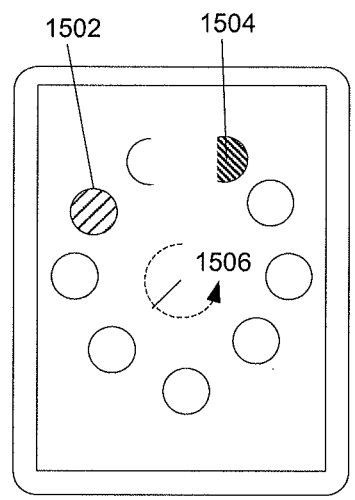

Reference is now made to FIGS. 15A and 15B, which illustrate example views of a circular list at various points during a scroll event. Three list elements 1500, 1502, and 1504 are illustrated. As can be seen from the FIGS., the spline curve associated with the items causes the list elements to move in a circular path indicated by 1506. In the embodiment illustrated, during a scroll event, list elements transition into and out of view at the top of list. In FIG. 15A, list element 1502 is shown transitioning into the user interface, list element 1500 is shown transitioning out of the user interface, and list element 1504 is shown in full view. In FIG. 15B, list element 1500 has left the view, 1502 has moved into full view and 1504 is transitioning out of view.

In the example illustrated, the list elements appear into view as if sliding out from behind a cover. In other embodiments, other transitions can be used, including but not limited to fading in or materializing.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope. In some instances, features of the method and/or the device have been described with respect to different embodiments. It is understood that all the features described herein may be included in a single embodiment, where feasible.

What is claimed is:

1. A method of modifying attributes of list elements in a layout space of a list as the list scrolls in a user interface, the method comprising:

for a duration of a scroll event, determining a series of location values of each list element, wherein a location value of a list element is based on a position of that list element in relation to a viewable portion of the list in the user interface;

wherein each list element has a set of spline curves associated with it, and each spline curve defines a relationship between location values of the list element and an attribute of the list element;

for each list element, at each determined location value of that list element, determining the attributes of that list element by evaluating the set of spline curves associated with that list element based on that location value; and re-rendering the list elements in accordance with the determined attributes for the duration of the scroll event.

2. The method of claim 1, wherein the attribute comprises a decoding attribute.

3. The method of claim 2, wherein the decoding attribute comprises an image decoding priority.

4. The method of claim 1, wherein the attribute comprises a response attribute.

5. The method of claim 4, wherein the response attribute comprises a double tap speed.

6. The method of claim 5, wherein the rendered attribute comprises a coordinate in the user interface.

7. The method of claim 1, wherein the attribute comprises a rendered attribute.

8. The method of claim 5, wherein the rendered attribute comprises at least one of an opacity, a color, a depth, an orientation, and a shape.

9. The method of claim 1, wherein the list is a linear list.

10. The method of claim 1, wherein the list is a circular list.

11. The method of claim 1, wherein the set of spline curves comprises functions that map the list element's location value with one or more attributes.

12. The method of claim 1, wherein the determining the attributes of said list element is only done when the location value corresponds to an on-screen position.

13. An electronic device comprising:
one or more processors; and,
memory comprising instructions which, when executed by one or more of the processors, cause the device to:

for a duration of a scroll event, determine a series of location values of each list element, wherein a location value of a list element is based on a position of that list element in relation to a viewable portion of the list in the user interface;

wherein each list element has a set of one or more spline curves associated with it, and each spline curve defines a relationship between location values of the list element and an attribute of the list element;

for each list element, at each determined location value of that list element, determine the attributes of that list element by evaluating a set of spline curves associated with that list element based on that location value; and re-render the list elements in accordance with the determined attributes for the duration of the scroll event.

14. The electronic device of claim 13, wherein the attribute comprises a decoding attribute.

15. The electronic device of claim 14, wherein the decoding attribute comprises an image decoding priority.

16. The electronic device of claim 13, wherein the attribute comprises a response attribute.

17. The electronic device of claim 16, wherein the response attribute comprises a double tap speed.

18. The electronic device of claim 13, wherein the attribute comprises a rendered attribute.

19. The electronic device of claim 18, wherein the rendered attribute comprises at least one of an opacity, a color, a depth, an orientation, and a shape.

20. The electronic device of claim 18, wherein the rendered attribute comprises a coordinate in the user interface.

21. The electronic device of claim 13, wherein the list is a linear list.

22. The electronic device of claim 13, wherein the list is a circular list.

23. The electronic device of claim 13, wherein the set of spline curves are functions that map the list element's location value with one or more attributes.

24. The electronic device of claim 13, wherein the determining the attributes of said list element is only done when the location value corresponds to an onscreen position.

25. A computer program product on an electronic device, the computer program product comprising non-transitory memory comprising instructions which, when executed by one or more processors of the electronic device, cause the electronic device to:

for a duration of a scroll event, determine a series of location values of each list element, wherein a location value of a list element is based on a position of that list element in relation to a viewable portion of the list in the user interface;

wherein each list element has a set of one or more spline curves associated with it, and each spline curve defines a relationship between location values of the list element and an attribute of the list element;

for each list element, at each determined location value of that list element, determine the attributes of that list element by evaluating a the set of spline curves associated with that list element based on that location value; and re-render the list elements in accordance with the determined attributes for the duration of the scroll event.

* * * * *

UNITED STATES PATENT AND TRADEMARK OFFICE
CERTIFICATE OF CORRECTION

PATENT NO. : 9,218,105 B2
APPLICATION NO. : 13/654039
DATED : December 22, 2015
INVENTOR(S) : Erik Magnus Månsson, Glenn Eric Kennard and Nils Fredrik Trobro Page 1 of 1

It is certified that error appears in the above-identified patent and that said Letters Patent is hereby corrected as shown below:

In the claims

Column 18, Line 12, In Claim 13, delete "a the" and insert -- the --, therefor.

Column 18, Line 60, In Claim 25, delete "a the" and insert -- the --, therefor.

Signed and Sealed this
Second Day of August, 2016

Michelle K. Lee
*Director of the United States Patent and Trademark Office*